(12) United States Patent
Madan et al.

(10) Patent No.: US 12,066,950 B2
(45) Date of Patent: Aug. 20, 2024

(54) APPROACH FOR MANAGING NEAR-MEMORY PROCESSING COMMANDS AND NON-NEAR-MEMORY PROCESSING COMMANDS IN A MEMORY CONTROLLER

(71) Applicant: Advanced Micro Devices, Inc., Santa Clara, CA (US)

(72) Inventors: Niti Madan, Austin, TX (US); John Kalamatianos, Boxborough, MA (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 0 days.

(21) Appl. No.: 17/561,454

(22) Filed: Dec. 23, 2021

(65) Prior Publication Data

US 2023/0205706 A1 Jun. 29, 2023

(51) Int. Cl.
*G06F 12/10* (2016.01)
*G06F 12/02* (2006.01)
*G06F 12/0882* (2016.01)
*G06F 12/1009* (2016.01)

(52) U.S. Cl.
CPC ...... *G06F 12/1009* (2013.01); *G06F 12/0207* (2013.01); *G06F 12/0882* (2013.01)

(58) Field of Classification Search
CPC ............ G06F 12/1009; G06F 12/0882; G06F 12/0207; G06F 13/1647; G06F 15/7821; G06F 13/1642
USPC ....................................................... 711/206
See application file for complete search history.

(56) References Cited

U.S. PATENT DOCUMENTS

| | | | |
|---|---|---|---|
| 5,101,485 A * | 3/1992 | Perazzoli, Jr. ...... | G06F 12/1009 718/107 |
| 2018/0196757 A1 | 7/2018 | Leidel et al. | |
| 2019/0034097 A1* | 1/2019 | Chang ................. | G06F 15/7821 |
| 2019/0392886 A1* | 12/2019 | Cox ..................... | G11C 11/4093 |
| 2020/0294558 A1* | 9/2020 | Yu ........................ | G11C 7/1039 |
| 2020/0356305 A1 | 11/2020 | Kim et al. | |
| 2021/0208801 A1 | 7/2021 | Song et al. | |
| 2021/0271599 A1* | 9/2021 | Sharovar ............. | G06F 12/0875 |
| 2021/0374055 A1 | 12/2021 | Aga et al. | |
| 2021/0382828 A1* | 12/2021 | Li ....................... | G06F 12/1009 |

(Continued)

OTHER PUBLICATIONS

The International Bureau of WIPO, "International Preliminary Report on Patentability" in International Application No. PCT 2022/051511 filed Dec. 1, 2022, 6 pages.

*Primary Examiner* — Hua J Song
(74) *Attorney, Agent, or Firm* — Hickman Becker Bingham Ledesma

(57) ABSTRACT

An approach is provided for managing PIM commands and non-PIM commands at a memory controller. A memory controller enqueues PIM commands and non-PIM commands and selects the next command to process based upon various selection criteria. The memory controller maintains and uses a page table to properly configure memory elements, such as banks in a memory module, for the next memory command, whether a PIM command or a non-PIM command. The page table tracks the status of memory elements as of the most recent memory command that was issued. The page table includes an "All Bank" entry that indicates the status of banks after processing the most recent PIM command. For example, the All Banks entry indicates whether all the banks have a row open and if so, specifies the open row for all the banks.

20 Claims, 9 Drawing Sheets

(56) References Cited

U.S. PATENT DOCUMENTS

2022/0076717 A1* 3/2022 Mathew ................. G06F 3/061
2022/0253247 A1* 8/2022 Kim ..................... G06F 3/0659

* cited by examiner

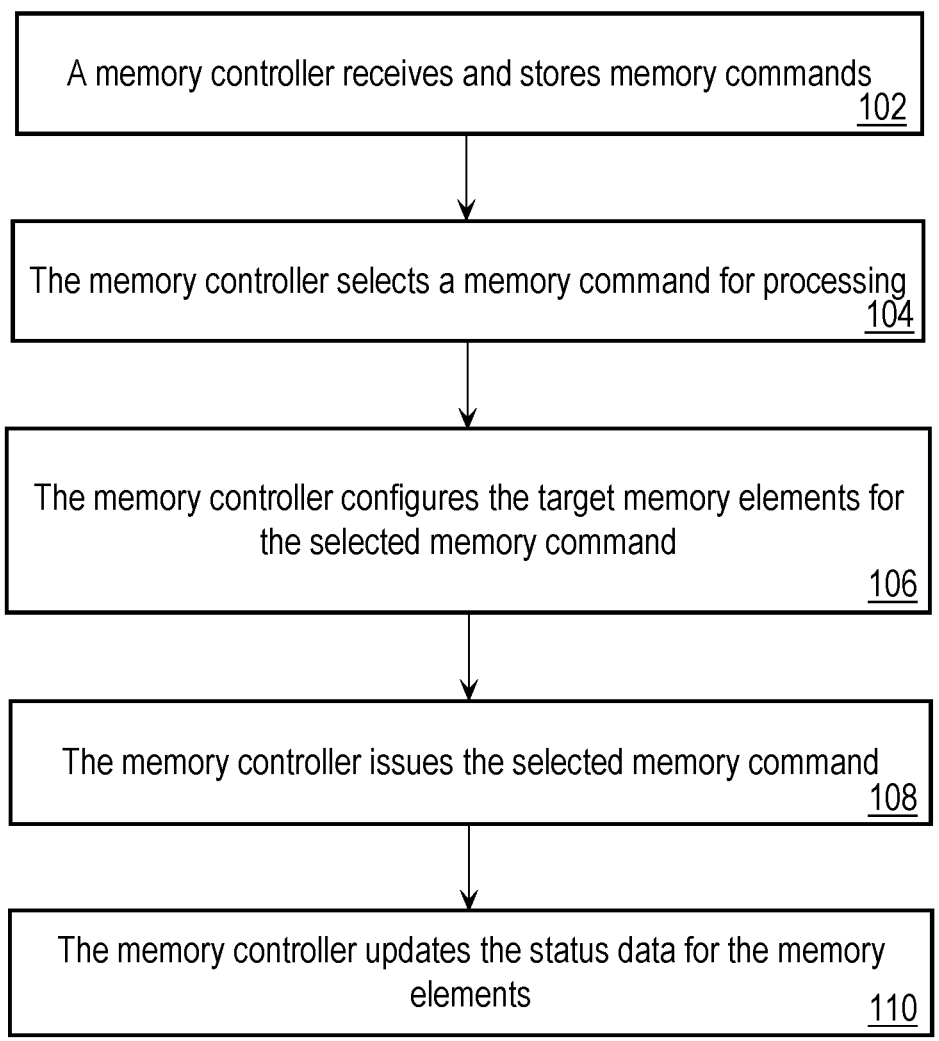

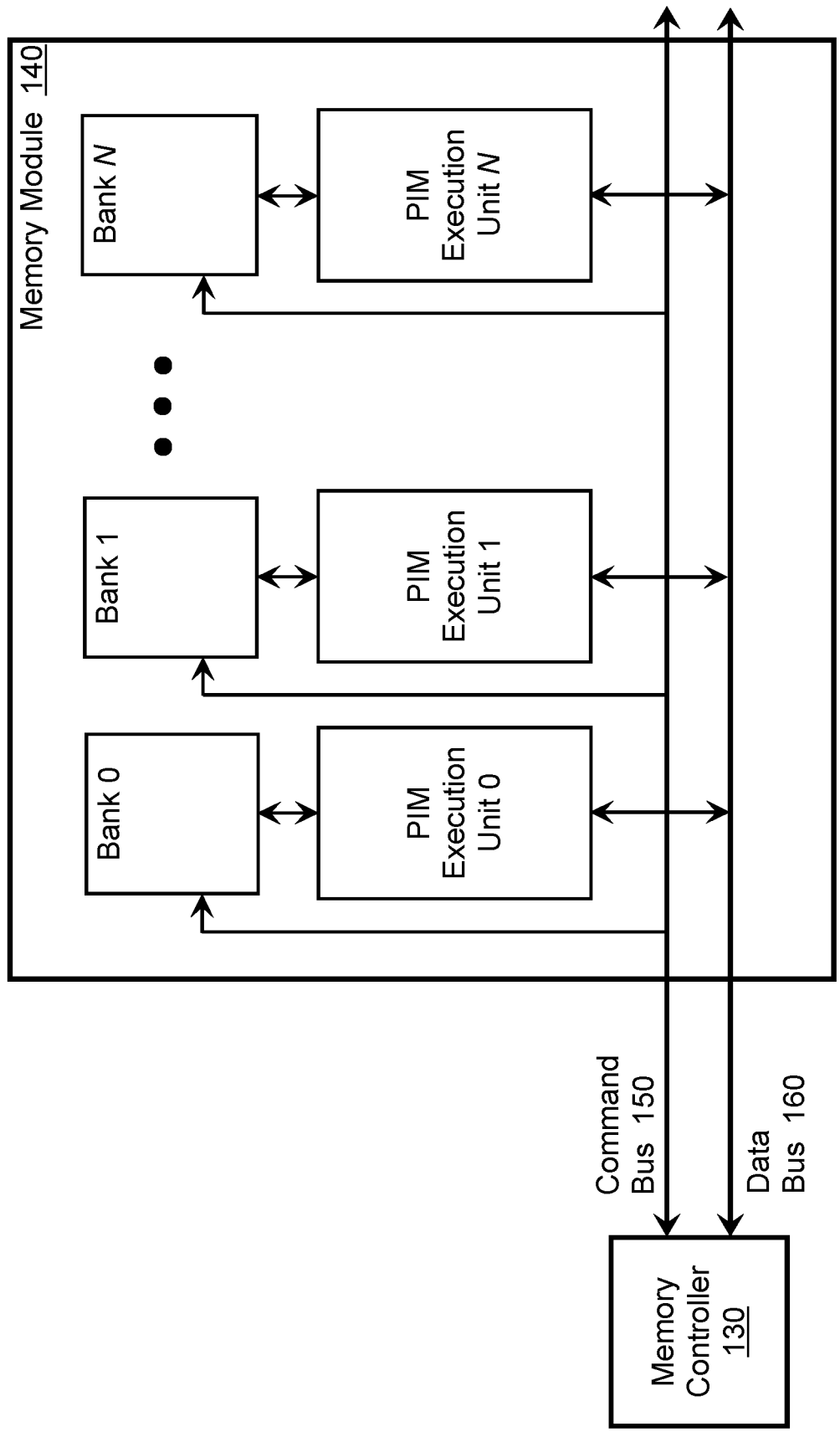

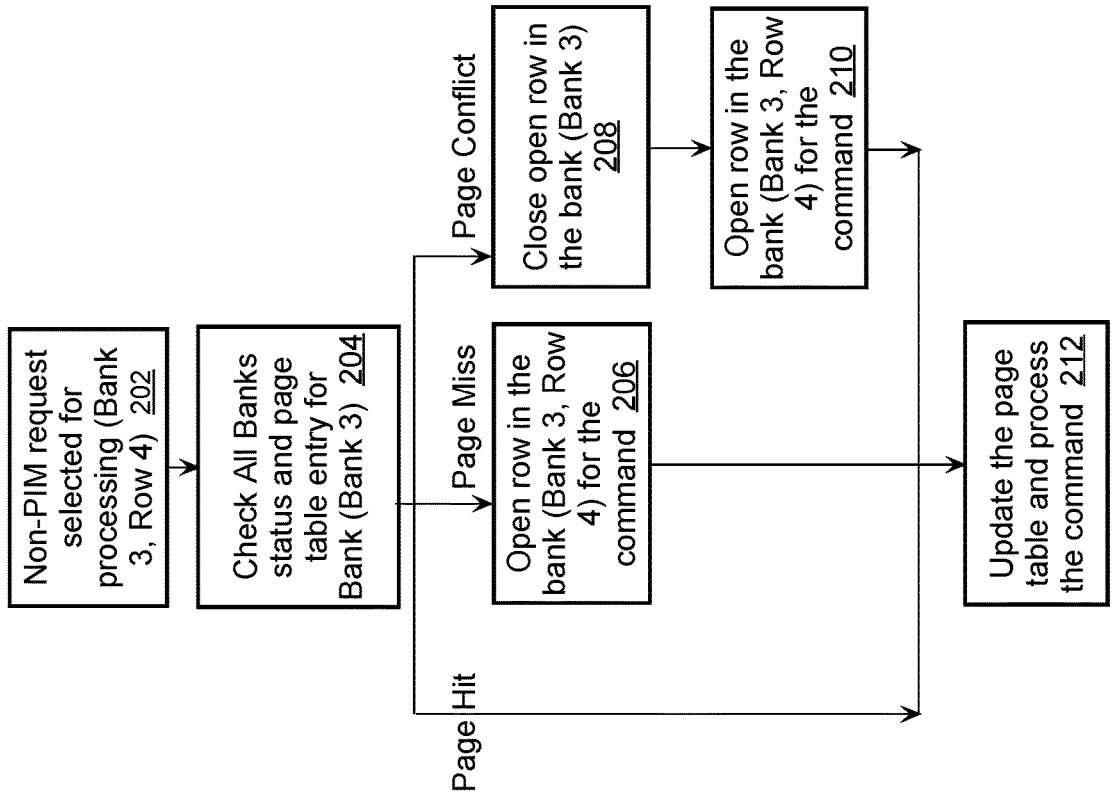

FIG. 2C

| Page Table 200 | | | | |
|---|---|---|---|---|
| Page Table Entry | Status | Bank ID | Row Open | Row ID |
| All Banks | Invalid | All Banks | N | n/a |
| PGT 0 | Valid | Bank 0 | Y | 8 |
| PGT 1 | Valid | Bank 1 | Y | 5 |
| PGT 3 | Valid | Bank 3 | Y | 4 |
| ⋮ | | | | |
| PGT N | Invalid | Bank N | N | n/a |

Non-PIM to PIM Transition

FIG. 2D

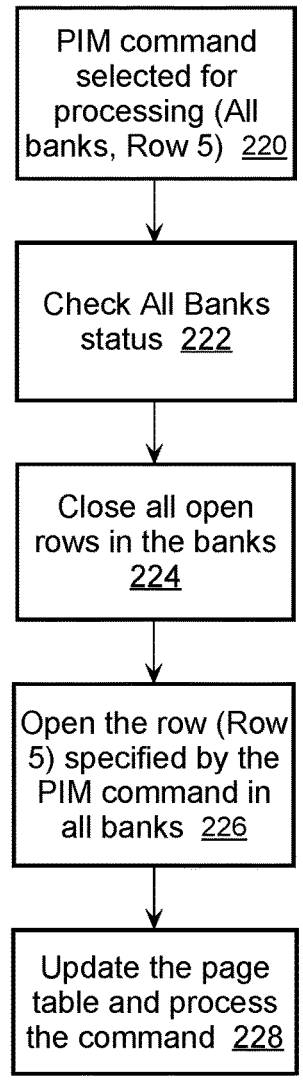

PIM command selected for processing (All banks, Row 5) 220

↓

Check All Banks status 222

↓

Close all open rows in the banks 224

↓

Open the row (Row 5) specified by the PIM command in all banks 226

↓

Update the page table and process the command 228

FIG. 2E

| Page Table 200 | | | | |
|---|---|---|---|---|
| Page Table Entry | Status | Bank ID | Row Open | Row ID |
| All Banks | Valid | All Banks | Y | 5 |
| PGT 0 | Invalid | Bank 0 | N | n/a |
| PGT 1 | Invalid | Bank 1 | N | n/a |
| PGT 3 | Invalid | Bank 3 | N | n/a |
| ⋮ | | | | |
| PGT N | Invalid | Bank N | N | n/a |

FIG. 2F

| Page Table 200 ||||||
|---|---|---|---|---|
| Page Table Entry | Status | Bank ID | Row Open | Row ID |
| All Banks | Valid | All Banks | Y | 5-->3 |
| PGT 0 | Invalid | Bank 0 | N | n/a |
| PGT 1 | Invalid | Bank 1 | N | n/a |
| PGT 3 | Invalid | Bank 3 | N | n/a |
| ⋮ | | | | |
| PGT N | Invalid | Bank N | N | n/a |

PIM to PIM Processing

FIG. 2G

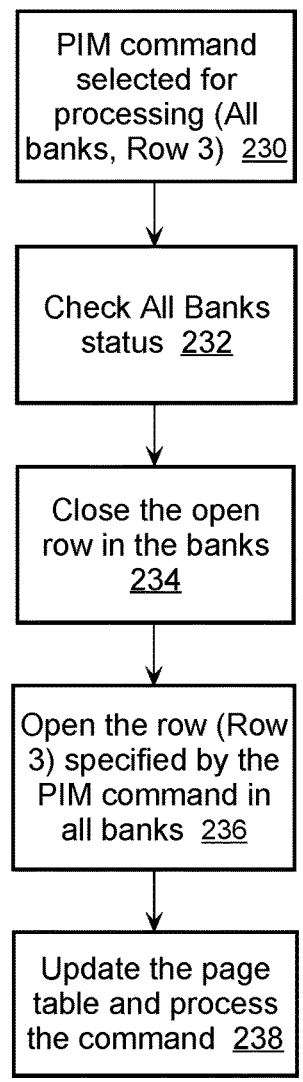

PIM command selected for processing (All banks, Row 3) 230

↓

Check All Banks status 232

↓

Close the open row in the banks 234

↓

Open the row (Row 3) specified by the PIM command in all banks 236

↓

Update the page table and process the command 238

PIM to non-PIM Transition

FIG. 2H

| Page Table 200 | | | | |
|---|---|---|---|---|
| Page Table Entry | Status | Bank ID | Row Open | Row ID |
| All Banks | Valid | All Banks | Y | 3 |
| PGT 0 | Invalid | Bank 0 | N | n/a |
| PGT 1 | Invalid | Bank 1 | N | n/a |
| PGT 3 | Invalid | Bank 3 | N | n/a |
| ⋮ | | | | |
| PGT N | Invalid | Bank N | N | n/a |

FIG. 2I

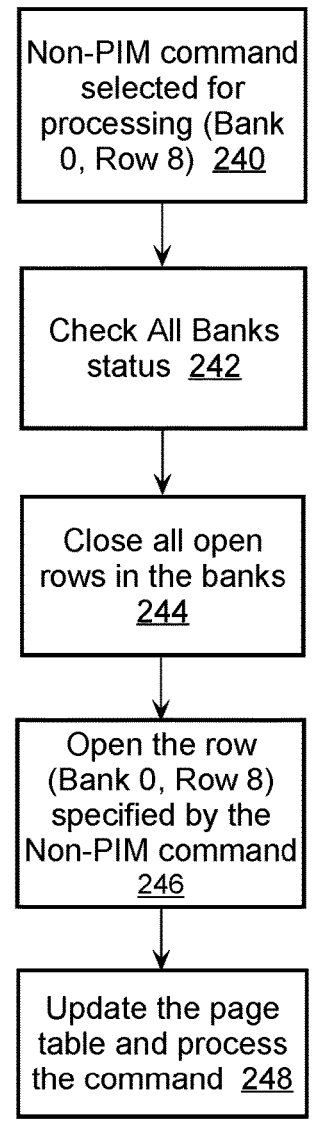

FIG. 2J

| Page Table 200 | | | | |
|---|---|---|---|---|
| Page Table Entry | Status | Bank ID | Row Open | Row ID |
| All Banks | Invalid | All Banks | N | n/a |
| PGT 0 | Valid | Bank 0 | Y | 8 |
| PGT 1 | Invalid | Bank 1 | N | n/a |
| PGT 3 | Invalid | Bank 3 | N | n/a |
| ⋮ | | | | |
| PGT N | Invalid | Bank N | N | n/a |

US 12,066,950 B2

APPROACH FOR MANAGING NEAR-MEMORY PROCESSING COMMANDS AND NON-NEAR-MEMORY PROCESSING COMMANDS IN A MEMORY CONTROLLER

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

As computing throughput scales faster than memory bandwidth, various techniques have been developed to keep the growing computing capacity fed with data. Processing In Memory (PIM) incorporates processing capability within memory modules so that tasks can be processed directly within the memory modules. In the context of Dynamic Random-Access Memory (DRAM), an example PIM configuration includes vector compute elements and local registers. The vector compute elements and the local registers allow a memory module to perform some computations locally, such as arithmetic computations. This allows a memory controller to trigger local computations at multiple memory modules in parallel without requiring data movement across the memory module interface, which can greatly improve performance, particularly for data-intensive workloads.

One of the challenges of PIM is how to process both PIM commands and non-PIM commands at a memory controller given their different processing requirements. For example, non-PIM commands are directed to a single DRAM bank, while PIM commands are broadcast commands directed to all banks in a DRAM module. Thus, conventional page tables that track the state of individual banks are inadequate for PIM commands. As another example, non-PIM commands typically require host-to-memory module data communication to write data to memory and read data from memory. In contrast, PIM commands use a "fire and forget" semantic that do not trigger host-to-memory module data communications, other than to provide metadata via the data bus to process the PIM commands. Example metadata includes such information as a command index value, process or thread IDs, constant values representing source operands, PIM register indices, etc. Thus, a memory controller has to process PIM commands differently than non-PIM commands.

One possible solution to address these issues is to isolate PIM and non-PIM command traffic when arriving at a memory controller by blocking one of the two command streams and processing them separately. This approach, however, can cause a large performance penalty attributable to delaying the processing of one of the two command streams. Another solution is to use a dedicated memory controller for PIM commands, but this comes with increased area and power costs. In view of the foregoing, there is therefore a need for an approach for processing both PIM and non-PIM commands by a memory controller that avoids the limitations and costs of current solutions.

BRIEF DESCRIPTION OF THE DRAWINGS

Implementations are depicted by way of example, and not by way of limitation, in the figures of the accompanying drawings and in which like reference numerals refer to similar elements.

FIG. 1A is a flow diagram that depicts an approach for managing broadcast near-memory processing commands and non-near-memory processing commands at a memory controller.

FIG. 1B is a block diagram that depicts a memory arrangement.

FIG. 2A depicts a page table that is an example implementation of the page table of FIG. 1C.

FIG. 2B is a flow diagram that depicts using a page table to perform Non-PIM to Non-PIM processing.

FIG. 2C depicts the state of a page table after a non-PIM command directed to Row 4 of Bank 3 was processed.

FIG. 2D is a flow diagram that depicts a Non-PIM to PIM Transition.

FIG. 2E depicts a page table after an All banks entry has been updated to specify that Row 5 is open in all banks.

FIG. 2F depicts a page table after the All banks entry has been updated to change the open row from 5 to 3.

FIG. 2G is a flow diagram that depicts an approach for performing PIM to PIM Processing.

FIG. 2H depicts the state of a page table after a PIM command directed to Row 3 of all banks was processed.

FIG. 2I is a flow diagram that depicts a PIM to non-PIM Transition.

FIG. 2J depicts a page table after an All banks entry has been invalidated and the "PGT 0" entry has been updated to indicate that Row 8 is open in Bank 0.

DETAILED DESCRIPTION

Figure 1C:
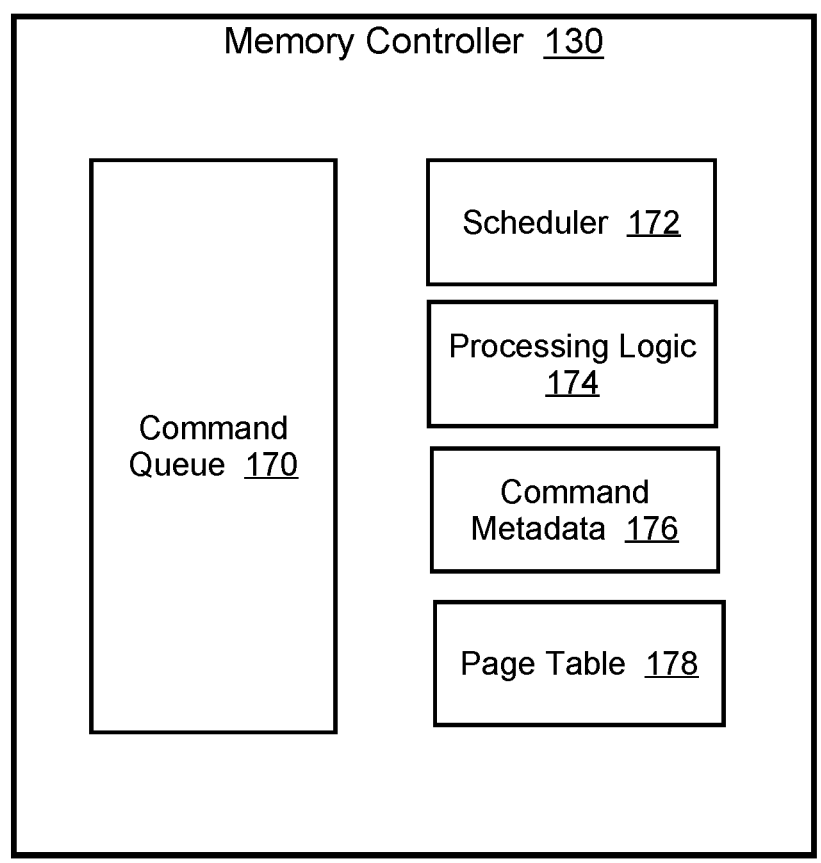
FIG. 1C depicts an example implementation of the memory controller and includes a command queue, processing logic, command metadata, and a page table.

In the following description, for the purposes of explanation, numerous specific details are set forth in order to provide a thorough understanding of the implementations. It will be apparent, however, to one skilled in the art that the implementations may be practiced without these specific details. In other instances, well-known structures and devices are shown in block diagram form in order to avoid unnecessarily obscuring the implementations.

I. Overview
II. Architecture
III. Selecting Commands For Processing
IV. Example Page Table With "All banks" Status
V. Non-PIM to Non-PIM Processing
VI. Non-PIM to PIM Transition
VII. PIM to PIM Processing
VIII. PIM to Non-PIM Transition I. Overview An approach is provided for managing PIM commands and non-PIM commands at a memory controller. A memory controller enqueues PIM commands and non-PIM commands and selects the next command to process based upon various selection criteria. Examples of selection criteria include, without limitation, command allocation bandwidth, a number of pending commands, an amount of time or number of cycles since a most recent command was issued, a presence of a marker, or global age, etc.

The memory controller maintains and uses a page table to properly configure memory elements, such as banks in a memory module, for the next memory command, whether a PIM command or a non-PIM command. The page table tracks the status of memory elements as of the most recent memory command that was issued. For example, the page table indicates whether a bank has an open row and if so, specifies the open row for the bank. According to an implementation, the page table includes an "All banks" entry that indicates the status of banks after processing the most recent PIM command. For example, the All Banks entry indicates whether all the banks have a row open and if so, specifies the open row for all the banks.

The approach of using a single All Banks entry in the page table to track the status of memory elements after processing the most recent PIM command allows the memory controller to efficiently manage, both from a computational cost and power consumption perspective, PIM commands and non-PIM commands without having to isolate PIM commands and non-PIM commands, which can cause a large performance penalty. The approach also avoids having a dedicated memory controller for PIM commands that would increase the area and power cost of scheduling commands to memory. Implementations include the memory controller issuing PIM commands in program order to maintain correctness. Although implementations are described herein in the context of PIM commands and non-PIM commands for purposes of explanation, implementations are applicable to any type of near-memory processing commands and non-near-memory processing commands.

FIG. 1A is a flow diagram 100 that depicts an approach for managing PIM commands and non-near-memory processing commands at a memory controller. In step 102, a memory controller receives and stores memory commands, e.g., in one or more queues. These include any number and type of PIM commands and non-PIM commands.

In step 104, the memory controller selects a memory command for processing. For example, the memory controller selects a memory command from one or more queues based upon various selection criteria.

In step 106, the memory controller configures the target memory elements for the selected memory command. According to an implementation, the memory controller uses the page table, and in particular the All Banks entry in the page table, to determine the current status of memory elements and configure the target memory elements, accordingly, as described in more detail hereinafter.

In step 108, the memory controller issues the selected memory command and in step 110, the memory controller updates the status data for the memory elements. This includes updating the page table as described in more detail hereinafter.

II. Architecture

FIG. 1B is a block diagram that depicts a computing arrangement 120. The computing arrangement 120 includes a memory controller 130 and a memory module 140. The computing arrangement 120 is implemented in any type of computing device including, for example, processors and a System on a Chip (SoC). The memory controller 130 and the memory module 140 are communicatively coupled via a command bus 150 and a data bus 160. As used herein, the term "bus" refers to any type of wired or wireless electrical coupling, such as wires, conductors, and/or wireless communications links. Implementations are depicted in the figures and described herein in the context of a single memory module 140 for purposes of explanation, but implementations are applicable to memory arrangements with any number of memory modules. The computing arrangement 120 may include other elements that are not depicted in the figures and described herein for purposes of explanation.

The memory module 140, which may be for example a DRAM memory module, includes a memory array having N+1 banks (Bank 0–Bank N) with corresponding PIM execution units (PIM Execution Unit 0–PIM Execution Unit N). Each bank includes cells defined by a two-dimensional array, but implementations are not limited to DRAM memory modules or banks per se, or banks with memory cells defined by a two-dimensional array and are applicable to other memory cell organizations. The memory array and banks may include other elements, such as buffers and decoders, that are not depicted in the figures and described herein for purposes of explanation.

The PIM execution units include processing logic and storage, such as local registers, for processing PIM commands, e.g., to perform logical operations, arithmetic operations, etc. Although the example of FIG. 1 depicts a separate PIM execution unit for each bank, implementations include a fewer number of PIM execution units, and the corresponding processing logic and storage, servicing multiple (or all) banks, including any type of near-memory processing.

The memory controller 130 manages the flow of data going to and coming from the memory module 140 and is implemented as a stand-alone element, for example on a separate die from a microprocessor, implemented separate from but on the same die as a microprocessor, or integrated into a microprocessor as an integrated memory controller. Implementations are applicable to any type of memory controller 130 and according to an implementation, the memory controller 130 includes processing logic that is configured to issue commands to the memory module 140.

FIG. 1C depicts an example implementation of the memory controller 130 and includes a command queue 170, a scheduler 172, processing logic 174, command metadata 176 and a page table 178. The memory controller 130 includes fewer or additional elements that vary depending upon a particular implementation and that are not depicted in the figures and described herein for purposes of explanation. In addition, the functionality provided by the various elements of the memory controller 130 are combined in any manner, depending upon a particular implementation.

The command queue 170 stores memory commands received by the memory controller 130, for example from one or more threads executing on a CPU, GPU, or other processor. According to an implementation, memory commands include PIM commands and non-PIM commands. PIM commands are broadcast memory commands directed to multiple memory elements in a memory module, such as multiple banks in a DRAM memory module. The target memory elements are specified by one or more bit values, such as a bit mask, in the PIM commands, and specify any number, including all, of the available target memory elements. PIM commands cause some processing to be performed by multiple, including all, of the specified memory elements in the memory module 130, such as a logical operation and/or a computation. As one non-limiting example, a PIM command specifies that at each target bank, a value is read from memory at a specified row and column into a local register, an arithmetic operation performed on the value, and the result stored back to memory. Examples of non-near-memory processing commands include, without limitation, load (read) commands, store (write) commands, etc. Unlike PIM commands that are broadcast memory processing commands and generally directed to multiple target banks, non-near-memory processing commands are directed to a single bank, i.e., are bank specific.

The command queue 170 stores commands to be issued by the memory controller 130. According to an implementation, the memory controller 130 stores PIM commands and non-PIM commands in the command queue 170 as they are received. Commands are stored in open slots of the command queue 170 and commands are grouped by type or in order of receipt regardless of type, depending upon a particular implementation. The command queue 170 is implemented by any type of storage capable of storing memory commands. Although implementations are depicted in the figures and described herein in the context of the command queue 170 being implemented as a single element, implementations are not limited to this example and according to an implementation, the command queue 170 is implemented by multiple elements, for example, a separate command queue for each of the banks in the memory module 140. The scheduler 172 schedules memory commands for processing. According to an implementation, the scheduler 172 selects commands for processing based upon various selection criteria, as described in more detail hereinafter.

The processing logic 174 stores memory commands in the command queue 170 and is implemented by computer hardware, computer software, or any combination of computer hardware and computer software. The command metadata 176 specifies one or more attributes of memory commands stored in the command queue 170, such as the type of command, e.g., PIM or non-PIM, a date and/or time when a memory command was stored in the command queue 170, a relative ordering of a memory command in the command queue 170, the type of command, command status, etc.

The page table 178 includes data that specifies the current state of one or more memory elements within a memory module and is used by the processing logic 174 to configure memory elements to process memory commands. For example, the page table 178 includes an entry for each bank of the memory module 140, where each entry specifies whether the corresponding bank currently has an open (activated) row from the most recent non-PIM command directed to that bank, if any, and if so, which row is currently open, e.g., via a row ID. When a row is opened or closed (deactivated) the processing logic 174 updates the corresponding entry in the page table 178. According to an implementation, the page table 178 also includes an All banks entry that specifies whether the banks have a row open from the most recent PIM command and if so, which row. The use of the All banks entry by the memory controller 130 to manage PIM and non-PIM commands is described in more detail hereinafter.

III. Selecting Commands for Processing

According to an implementation, the scheduler 172 is configured to use a two-stage process for selecting a memory command to be processed. At the first stage, the scheduler 172 selects between a PIM command and a group of candidate non-PIM commands based upon various criteria. At the second stage, the scheduler 172 selects a particular PIM command from the command queue 170, or a particular non-PIM command from the group of candidate non-PIM commands from the command queue 170, depending upon whether a PIM command or the group of candidate non-PIM commands was selected at the first stage.

Figure 1D:
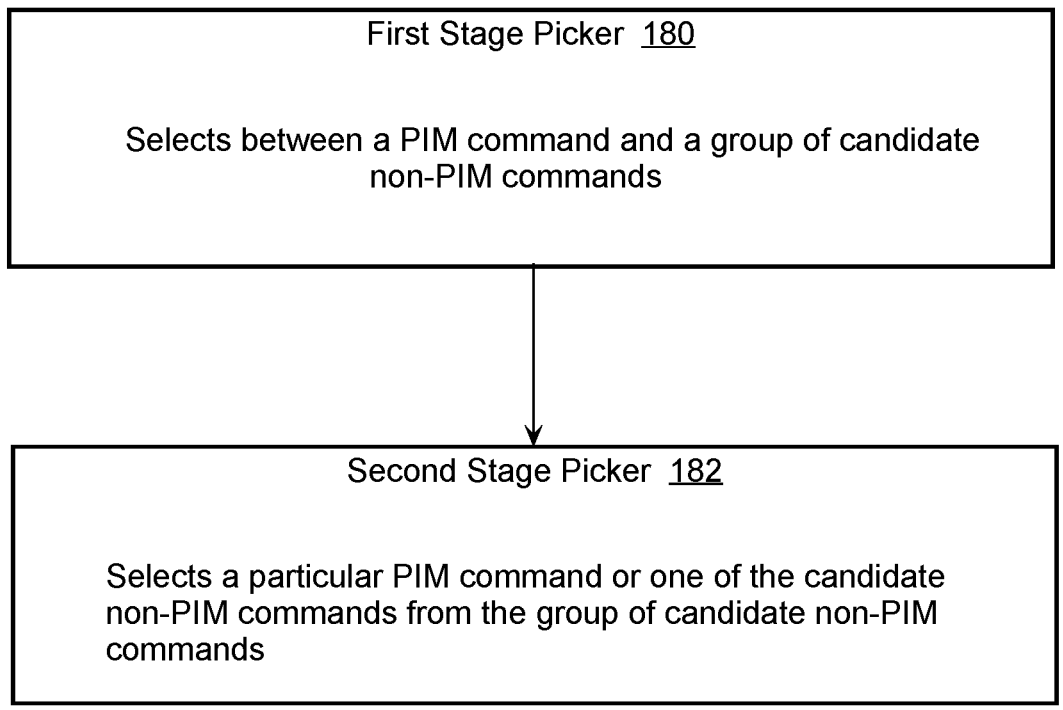
FIG. 1D is a block diagram that logically depicts a two-stage process used by a scheduler and includes a first stage picker and a second stage picker.

FIG. 1D is a block diagram 180 that logically depicts the two-stage process used by the scheduler 172 and includes a first stage picker 180 and a second stage picker 182. The first stage picker 180 and the second stage picker 182 represent functionality of the scheduler 172 that is implemented in computer hardware, computer software, or any combination of computer hardware and computer software.

The first stage picker 180 is configured to select between a PIM command or a group of candidate non-PIM commands from the command queue 170 based upon selection criteria that vary depending upon a particular implementation. For the group of candidate non-PIM commands, ready non-PIM commands in the command queue 170 are classified as page hits, page misses or page conflicts based upon the bank and row specified by each command and the status of the bank and row in the page table 178. Command readiness is defined by the next command to be issued, the earliest time this command can be issued without violating memory timing parameters, the memory element (bank) status of the command and the last command issued to the channel. According to an implementation, non-PIM commands are further classified by other criteria that include, without limitation, real-time traffic, e.g., display refresh, I/O device traffic, etc. One ready candidate non-PIM page hit command, one ready candidate non-PIM page miss command, and one ready candidate non-PIM page conflict command are selected for the group of candidate non-PIM commands.

According to one implementation, the selection criteria include a command bandwidth allocation. Command bandwidth is allocated between PIM commands and non-PIM commands and when one of the allocations has been consumed, the first stage picker 180 switches to the other type of command. For example, if the command bandwidth allocated to PIM commands has been consumed, then the first stage picker 180 switches to processing non-PIM commands. Similarly, if the command bandwidth allocated to non-PIM commands has been consumed, then the first stage picker 180 switches to processing PIM commands. The command bandwidth allocations are specified, for example, by system configuration information.

According to another implementation, the selection criteria include a number of pending commands threshold. In this implementation, the first stage picker 180 switches between processing PIM commands and non-PIM commands when the number of pending PIM commands or non-PIM commands, respectively, reaches a threshold. The same pending command threshold is used for both PIM commands and non-PIM commands, or separate thresholds are used, depending upon a particular implementation, and thresholds may be specified either via configuration information of programmatically. For example, a programmer may specify a lower pending PIM command threshold for workloads that include large PIM code regions. According to another implementation, the selection criteria include a number of cycles or time since a particular type of command was issued. For example, the first stage picker 180 switches from processing PIM commands to processing non-PIM commands when a specified number of cycles or amount of time has elapsed since the last non-PIM command was processed, and vice versa. This is useful in situations to satisfy a quality of service requirement.

According to another implementation, the selection criteria include the presence of a specific marker. For example, a switch is made between processing PIM commands and non-PIM commands based upon the presence in the command queue 170 of a command with a specified marker. The marker indicates, for example, the endpoint of a group of PIM or non-PIM commands and may be specified by software, e.g., added by a software developer, or inserted by the memory controller 130 when a memory address dependency, e.g., Write-After-Read (WAR), Write-After-Write (WAW), Read-After-Write (RAW), etc., is detected between a PIM command and a non-PIM command, even from different processor threads.

According to yet another implementation, the selection criteria include global age. For the global age criteria, the first stage picker 180 selects between processing PIM commands and non-PIM commands based upon the oldest command type in the command queue 170 based upon the command metadata 176. For example, a PIM command is selected for processing if the oldest command in the command queue 170 is a PIM command, and vice versa.

According to an implementation, bursting is used as a factor in selecting a next command to process. For example, when the current command is a PIM command, the next PIM command in program order that is the same type, i.e., read or write, as the current PIM command is selected over a non-PIM command, even though the non-PIM command would normally be selected based upon other selection criteria. This increases processing efficiency by creating larger read or write PIM command bursts and reducing costs associated with switching between reads and writes, e.g., read turnaround and write turnaround.

All of the aforementioned selection criteria may be used individually, or in any combination, to achieve a desired level of balance between processing PIM commands and processing non-PIM commands, depending upon a particular implementation.

If the first stage picker 180 selects a PIM command for processing, then at the second stage picker 182 the oldest PIM command is selected from the command queue 170 based upon the command metadata 176, which indicates times at which commands were enqueued into the command queue 170. This maintains the program ordering of PIM commands and avoids structural hazards in the PIM pipeline. In the event that the selected PIM command is not ready, then the scheduler 172 waits until the selected PIM command is ready.

If the first stage picker 180 selects the group of candidate non-PIM commands, then the second stage picker 182 selects one of the candidate non-PIM commands, i.e., either the ready candidate non-PIM page hit, page miss, or page conflict command. According to an implementation, the second stage picker 182 selects the oldest of these three ready candidate non-PIM command, based upon the command metadata 176, although this is not required to maintain correctness for non-PIM commands.

According to an implementation, the memory controller 130 is configured to manage PIM request tokens to ensure proper processing of PIM commands. This includes converting received PIM commands that are normally processed as memory write commands to memory read commands so that write buffering techniques, e.g., write bursting, are not employed by the scheduler 172 when selecting PIM commands from the command queue 170. This allows the scheduler 172 to immediately select PIM commands in the same manner as non-PIM commands. The data fabric reserves data buffer tokens before sending PIM commands to the memory controller 130 to ensure the corresponding metadata is copied to the memory controller's 130 dedicated PIM data buffers. Since no data is returned from memory when issuing PIM commands, the data buffer tokens are held only until the PIM command is issued, after which the data buffer holding the metadata for the PIM command can be reused. Metadata for PIM commands is used by the memory controller 130 or forwarded to the PIM device while the PIM commands are issued. Alternatively, if sufficient signaling is available, then PIM command metadata may be provided to the memory controller 130 via the signaling.

IV. Example Page Table with "all Banks" Status

FIG. 2A depicts a page table 200 that is an example implementation of the page table 178 of FIG. 1C. The memory controller 130 uses the page table 200 to track the status of memory module banks and properly configure the banks for the next memory command. According to an implementation, the page table 200 includes an entry for each bank that tracks the status of the corresponding bank after the most recent non-near-memory processing command, i.e., non-PIM command. The page table 200 also includes a single entry that tracks the status of all the banks after the most recent PIM command, i.e., a PIM command.

In the example of FIG. 2A, the page table 200 includes entries "PGT 0" through "PGT N," that indicate the status of each bank after the most recent non-PIM command. Each entry specifies a status, a bank ID, whether row is open for the bank, and row ID for an open row, if applicable. A status value of "Valid" indicates that the bank specified by the bank ID currently has an open row and a status of "Invalid" indicates that the bank specified by the bank ID does not currently have an open row. The bank ID is data that identifies the bank that corresponds to the entry, the row open column indicates whether the bank currently has an open row ("Y"), or does not currently have an open row ("N"). The row ID is data that identifies the row that is currently open for the bank or "n/a" if the bank does not currently have an open row. As one example, the status data in the second entry ("PGT 1") in the page table 200 specifies that Bank 1 currently has Row 5 open. One or more of the entries "PGT 0" through "PGT N" are checked and/or updated each time that a non-PIM command is issued.

The first entry in the page table 200 is a novel All Banks entry that specifies whether the banks currently have a row open as a result of processing the most recent PIM command and if so, which row. For example, suppose that the memory controller 130 issues a broadcast PIM command that specifies Row 6, i.e., all of the banks are to perform a particular memory operation, which may include a local computation, at Row 6 and a particular column. The processing logic 174 updates the All Banks entry with a status value of "Valid," a row open value of "Y" and a row ID of 6. The processing logic 174 also invalidates the other bank-specific entries PGT 0 through PGT N in the page table 178 for non-PIM commands, if necessary, i.e., if the prior command that was issued was a non-PIM command, as described in more detail hereafter. As the memory controller 130 issues successive PIM commands, the processing logic 174 updates the value of the row ID with the row specified by the most recent PIM command. This continues until the memory controller 130 issues a non-PIM command, after which the processing logic 174 invalidates the All Banks entry, i.e., by changing the status to "Invalid", the row open to "N" and the row ID to "n/a" and updates the entry for the particular target bank specified by the non-PIM command as described in more detail hereinafter. Thus, a status of "Valid" in the All Banks entry indicates that the last command issued by the memory controller 130 was a broadcast PIM command issued to all banks, or a specified subset of banks, while a status of "Invalid" in the All Banks entry indicates that the last command issued by the memory controller 130 was not a broadcast PIM command, and instead was a bank-specific non-near-memory processing command.

V. Non-PIM to Non-PIM Processing

FIG. 2B is a flow diagram that depicts using the page table 200 to perform "Non-PIM to Non-PIM processing," i.e., processing a non-PIM command when the most recent command issued was also a non-PIM command. In step 202, a non-PIM command is selected for processing. For example, the memory controller 130 selects a non-PIM command from the command queue 170 based upon selection criteria. In the present example, it is presumed that the non-PIM command is directed to Bank 3, Row 4.

In step 204, the All Banks status is checked. According to an implementation, the processing logic 174 checks the status of the All Banks entry in the page table 200. Since in this example the prior command that was processed was a non-PIM command, the All Banks entry in the page table 200 has a status of "Invalid" and the processing logic 174 proceeds to check the page table entry for the selected command to determine the status. In the present example, the processing logic 174 examines the fourth entry "PGT 3" for Bank 3, which indicates that Bank 3 does not currently have a row open. Thus, there is a page miss in the page table 200 and in step 206, the processing logic opens the row in the bank required by the command. In the present example, the processing logic 174 issues an activate command to open Row 4 in Bank 3. Control then proceeds to step 212 and the processing logic 174 updates the page table to record the change in status for Bank 3, namely, by changing the Status field from "Invalid" to "Valid," changing the Row Open field from "N" to "Y" and the Row ID field from "n/a" to "4." The processing logic 212 then issues the command.

If, in step 204, Row 4 of Bank 3 was currently open, then this represents a page hit and control proceeds to step 212. If, however, in step 204, a different row of Bank 3 is currently open, then this is a page conflict and in step 208, the processing logic 174 closes the currently open row, for example by issuing a precharge command to Bank 3. In step 210, the processing logic 174 then opens the row needed to process the selected command, which in the present example is Row 3, by issuing an activate command to open Row 4 in Bank 3. Control then proceeds to step 212 as previously described.

Steps 202-212 are repeated for any number of non-PIM commands, the processing logic 174 opening and closing rows in banks as needed and then updating the page table 200. FIG. 2C depicts the page table after being updated by the processing logic 174 after Row 4 of Bank 3 was opened.

VI. Non-PIM to PIM Transition

The processing logic 174 eventually selects a PIM command for processing, switching from non-PIM mode to PIM mode, also referred to herein as a "Non-PIM to PIM Transition." According to an embodiment, once a Non-PIM to PIM Transition decision is made, the scheduler 172 blocks all pending non-PIM commands that have not yet been issued to the memory module 140 and waits for issued non-PIM commands to be removed from the command queue 170. FIG. 2C depicts the state of the page table 200 at this point in time, after the non-PIM command directed to Row 4 of Bank 3 was processed, and the All Banks entry is Invalid. FIG. 2D is a flow diagram that depicts a Non-PIM to PIM Transition, i.e., switching from processing non-PIM commands to PIM commands.

In step 220, a PIM command is selected for processing, for example using selection criteria as previously discussed herein. In the present example, it is presumed that the processing logic 174 selects a PIM command that performs a memory command at Row 5 of all banks.

In step 222, the All Banks status is checked. According to an implementation, the processing logic 174 checks the status of the All Banks entry in the page table 200. Since in this example the prior command that was processed was a non-PIM command, the All Banks entry in the page table 200 has a status of "Invalid," which represents a page conflict, and control proceeds to step 224 where all of the open rows in the banks are closed. For example, the processing logic 174 accomplishes this by issuing an all banks precharge command or a separate precharge command to each bank with an open row. The decision of whether to use an all banks precharge command or a separate precharge command to each bank with an open row may be made based upon the costs of issuing an all banks precharge command versus separate precharge commands to banks with open rows. Example costs include computational costs, power consumption, etc. For example, in situations where only a small number of banks have open rows and it is less expensive to issue separate precharge commands to those banks, then separate precharge commands are used instead of an all banks precharge command. If however, a large number of banks have open rows and it is less computationally expensive to issue a single all banks precharge command, then the all banks precharge command is issued instead of a separate precharge command to each bank.

In step 226, the row specified by the PIM command is opened in all banks. For example, the processing logic 174 issues an activate command for each bank or an all banks activate command to open the row. In the present example, the processing logic 174 opens Row 5 in all banks. In step 228, the page table is updated, and the PIM command is processed. For example, the processing logic 174 updates the All Banks entry in the page table 200. FIG. 2E depicts the page table 200 after the All Banks entry has been updated to specify that Row 5 is open in all banks. The use of the All Banks entry in this manner provides the technical benefit of not having to update all of the entries in the page table 200 to specify that Row 5 is open. Instead, only the All Banks entry needs to be updated, which reduces computational resources and power consumption.

VII. PIM to PIM Processing

As PIM commands continue to be selected for processing, the processing logic 174 performs so called "PIM to PIM Processing." FIG. 2G is a flow diagram that depicts an approach for performing PIM to PIM Processing.

In step 230, another PIM command is selected for processing, for example using selection criteria as previously discussed herein. In the present example, it is presumed that the processing logic 174 selects a PIM command that performs a memory command at Row 3 of all banks.

In step 232, the All Banks status is checked. According to an implementation, the processing logic 174 checks the status of the All Banks entry in the page table 200. Since in this example the prior command that was processed was a PIM command, the All Banks entry in the page table 200 currently has a status of "Valid." A status of Valid in the All Banks entry means that a row is currently open in all the banks and represents either a page hit or a page conflict, depending upon whether the row specified by the PIM command is the same or different than the row that is currently open in the banks, as indicated by the All Banks entry in the page table 200. In the present example, since the PIM command specifies a memory operation to be performed on Row 3 of the banks and Row 5 is currently open, this represents a page conflict. If the current PIM command specified Row 5, then this would represent a page hit. A status of Valid represents a page hit if the row specified by the PIM command is the same as the row that is currently open in all the banks, as indicated by the All Banks entry in the page table 200.

Since in the present example the check of the All Banks entry results in a page conflict, in step 234, the open row is closed in all the banks. For example, the processing logic 174 accomplishes this by issuing an all banks precharge command. In step 236, the row specified by the PIM command is opened in all banks. For example, the processing logic 174 issues an all banks activate command, or an activate command for each bank, to open the row. In the present example, the processing logic 174 opens Row 3 in all banks. If the check of the All Banks status in step 232 results in a page hit, i.e., the row specified by the PIM command is the same as the currently open row, then steps 234 and 236 are not performed.

In step 238, the page table is updated, and the PIM command is processed. For example, the processing logic 174 updates the All Banks entry in the page table 200 to change the open row from 5 to 3. FIG. 2F depicts the page table 200 after the All Banks entry has been updated to change the open row from 5 to 3. As before, the use of the All Banks entry in this manner provides the technical benefit of not having to update all of the entries in the page table 200 to specify that Row 3 is open. Instead, only the All Banks entry needs to be updated, which reduces computational resources and power consumption.

VIII. PIM to Non-PIM Transition

After processing PIM commands, which may be any number and types of PIM commands, the processing logic 174 selects a non-PIM command for processing, switching from PIM mode to back to the non-PIM mode, also referred to herein as a "PIM to non-PIM Transition." Once this decision is made, the scheduler 172 completes processing of the current PIM command and stops selecting further PIM commands. The scheduler 172 also unblocks all non-PIM traffic. FIG. 2H depicts the state of the page table 200 after the PIM command directed to Row 3 of all banks was processed. Thus, Row 3 is open in all banks.

FIG. 2I is a flow diagram that depicts a PIM to non-PIM Transition, i.e., switching from processing PIM commands to non-PIM commands. In step 240, a non-PIM command is selected for processing, for example using selection criteria as previously discussed herein. In the present example, it is presumed that the processing logic 174 selects a non-PIM command that performs a memory operation at Row 8 of Bank 0.

In step 242, the All Banks status is checked. According to an implementation, the processing logic 174 checks the status of the All Banks entry in the page table 200. Since in this example the prior command that was processed was a PIM command, the All Banks entry in the page table 200 has a status of "Valid," which means that all of the banks have a row open, so in step 244 the open row is closed in all of the banks. For example, the processing logic 174 accomplishes this by issuing an all banks precharge command.

In step 246, the row specified by the non-PIM command is opened in the specified bank. For example, the processing logic 174 issues an activate command for Bank 0 to open Row 8. In step 248, the page table is updated, and the non-PIM command is processed. In the present example, the processing logic 174 invalidates the All Banks entry and updates the entry "PGT 0" in the page table 200 to specify that Row 8 is open for Bank 0. FIG. 2J depicts the page table 200 after the All Banks entry has been invalidated and the "PGT 0" entry has been updated to indicate that Row 8 is open in Bank 0.

After the process of FIG. 2I, any number of non-PIM commands are processed using the non-PIM to non-PIM processing previously described herein. The aforementioned approach for a memory controller to process both non-PIM commands and PIM commands using a single entry in a page table for PIM commands is efficient and avoids having to maintain a separate entry for each bank in the page table for PIM commands.

Figure 3:
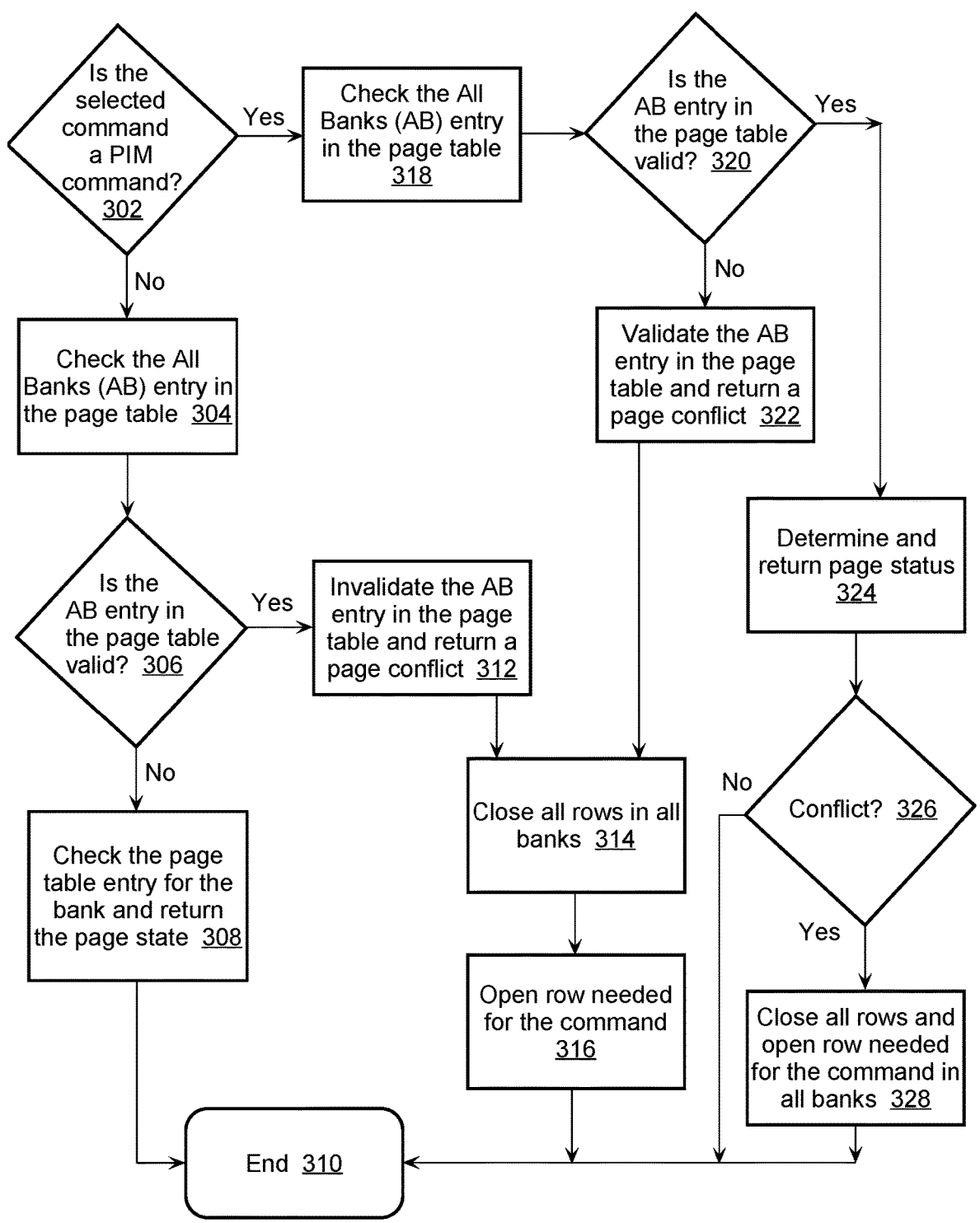
FIG. 3 is a flow diagram that depicts an approach for processing PIM and non-PIM commands at a memory controller.

FIG. 3 is a flow diagram 300 that depicts an approach for processing PIM and non-PIM commands at a memory controller. The process starts with the memory controller 130 selecting a next command to process as previously described herein. In step 302, a determination is made whether the selected command is a PIM command. If not, then the selected command is a non-PIM command an in step 304, the status of the All Banks entry in the page table is checked. For example, the processing logic 174 checks the All Banks entry in the page table 200. In step 306, a determination is made whether the All Banks entry in the page table is valid. For example, the processing logic 174 determines whether the status of the All Banks entry in the page table 200 is "Valid" or "Invalid."

If, in step 306, a determination is made that the status of the All Banks entry is Invalid, then the most recent command that was processed was a non-PIM command and in step 308, the page table entry for the target bank of the command is checked and the page state returned. For example, suppose that the non-PIM command is directed to Bank 3, Row 4. The processing logic 174 examines the fourth entry "PGT 3" for Bank 3 in the page table 200. If the status is "Invalid," then Bank 3 does not currently have a row open and the processing logic returns a page state of "Miss." If the status is "Valid" and Bank 3 currently has Row 4 open, then the processing logic 174 returns a page state of "Hit." If the status is "Valid" and Bank 3 has any other row open, then the processing logic 174 returns a page state of "Conflict." Control then proceeds to step 310, and the process is complete.

Returning to step 306, if a determination is made that the status of the All Banks entry is Valid, then the most recent command that was processed was a PIM command and all of the banks have the same open row. In step 312, the All Banks entry in the page table is invalidated and entry for the target bank of the command is checked and the page state of "Conflict" is returned. In step 314, all rows in all banks are closed. For example, the processing logic 174 issues an All Banks precharge command to close all rows in all banks and control proceeds to step 310 and the process is complete. In step 316, the row needed to process the command is opened in the target bank. Since the current command is a non-PIM command, the row specified by the command is opened in the target bank. For example, the processing logic 174 issues an activate command for the bank and row specified by the non-PIM command selected for processing.

Returning to step 302, if the determination is made that the selected command is a PIM command, then in step 318, the status of the All Banks entry in the page table is checked. For example, the processing logic 174 checks the All Banks entry in the page table 200. In step 320, a determination is made whether the All Banks entry in the page table is valid. For example, the processing logic 174 determines whether the status of the All Banks entry in the page table 200 is "Valid" or "Invalid." If the status of the All Banks entry is "Invalid," then the most recently processed command was a non-PIM command and in step 322, the All Banks entry in the page table is validated. For example, the processing logic 174 changes the status of the All Banks entry in the page table to "Valid." Control then proceeds again to step 314 and all rows in all banks are closed to close rows that were opened by prior non-PIM commands. In step 316, the row needed to process the command is opened in the target banks. Since the current command is a non-PIM command, the row specified by the PIM command is opened in all of the banks, e.g., by the processing logic 174 issuing an activate command for the row specified by the PIM command in all banks.

Returning to step 320, if a determination is made that the All Banks entry in the page table is valid, then the most recently issued command was also a PIM command and all of the banks have an open row. In step 324, the page state of the All Banks entry is determined and returned. For example, the processing logic 174 checks the currently open row specified by the All Banks entry in the page table 200 and if the open row is the same as the row specified by the current (PIM) command, then the page status is a page "Hit" and the process is complete in step 310, since the row needed to process the current (PIM) command is already open in all banks. If the currently open row is different than the row specified by the current (PIM) command, then the page status is a page "Conflict," and in step 326, all rows are closed, and the row specified by the current (PIM) command is opened in all banks. The process is then complete in step 310.

The invention claimed is:
1. A memory controller configured to:
   select for processing a broadcast near-memory processing command, and
   maintain a status entry in the memory controller that specifies a status of two or more memory elements after the broadcast near-memory processing command has been processed by the two or more memory elements.
2. The memory controller of claim 1, wherein the selection of the broadcast near-memory processing command is based on selection criteria including one or more of command allocation bandwidth, a number of pending commands, an amount of time or number of cycles since a most recent command was issued, a presence of a marker, or global age.
3. The memory controller of claim 1 further configured to maintain the status entry of the two or more memory elements as a single entry in a page table.
4. The memory controller of claim 3, wherein the status of the two or more memory elements indicates a valid status or an invalid status.
5. The memory controller of claim 3, wherein the status of the two or more memory elements indicates a row that is currently open in the two or more memory elements.
6. The memory controller of claim 1, further configured to:
   in response to a prior memory command processed being a non-near-memory processing command and selecting the broadcast near-memory processing command for processing:
      close all open rows in the two or more memory elements in a memory module,
      open, in the two or more memory elements in the memory module, a row specified by the broadcast near-memory processing command, and
      update a single status entry for the two or more memory elements in a page table to indicate that the row specified by the broadcast near-memory processing command is open in the two or more memory elements.
7. The memory controller of claim 1, further configured to:
   in response to a prior memory command processed being a broadcast near-memory processing command and selecting a non-near-memory processing command for processing:
      close all open rows in the two or more memory elements in a memory module,
      open a particular row in a particular memory element, from the two or more memory elements in the memory module, specified by the non-near-memory processing command, and
      update a status entry for the particular memory element in a page table to indicate that the particular row is open in the particular memory element.
8. The memory controller of claim 1, wherein the broadcast near-memory processing command is selected for processing from a set of queued commands that includes the broadcast near-memory processing command and a non-near-memory processing command.
9. A method comprising:
   selecting for processing, by a memory controller, a broadcast near-memory processing command, and
   maintaining, by the memory controller, a status entry in the memory controller that specifies a status of two or more memory elements after the broadcast near-memory processing command has been processed by the two or more memory elements.
10. The method of claim 9, wherein the selection of the broadcast near-memory processing command is based on selection criteria including one or more of command allocation bandwidth, a number of pending commands, an amount of time or number of cycles since a most recent command was issued, a presence of a marker, or global age.
11. The method of claim 9, further comprising maintaining the status entry of the two or more memory elements as a single entry in a page table.
12. The method of claim 11, wherein the status of the two or more memory elements indicates a valid status or an invalid status.
13. The method of claim 11, wherein the status of the two or more memory elements indicates a row that is currently open in the two or more memory elements.
14. The method of claim 9, further comprising:
   in response to a prior memory command processed being a non-near-memory processing command and selecting the broadcast near-memory processing command for processing:
      closing all open rows in the two or more memory elements in a memory module,
      opening, in the two or more memory elements in the memory module, a row specified by the broadcast near-memory processing command, and
      updating a single status entry for the two or more memory elements in a page table to indicate that the row specified by the broadcast near-memory processing command is open in the two or more memory elements.
15. The method of claim 9, further comprising:
   in response to a prior memory command processed being a broadcast near-memory processing command and selecting a non-near-memory processing command for processing:
      closing all open rows in the two or more memory elements in a memory module,
      opening a particular row in a particular memory element, from the two or more memory elements in the memory module, specified by the non-near-memory processing command, and updating a status entry for the particular memory element in a page table to indicate that the particular row is open in the particular memory element.

16. The method of claim 9, wherein the broadcast near-memory processing command is selected for processing from a set of queued commands that includes the broadcast near-memory processing command and a non-near-memory processing command.

17. A processor comprising:
a command queue; and
a memory controller configured to:
  store a broadcast near-memory processing command in the command queue,
  select for processing the broadcast near-memory processing command, and
  maintain a status entry in the memory controller that specifies a status of two or more memory elements after the broadcast near-memory processing command has been processed by the two or more memory elements.

18. The processor claim 17, wherein the memory controller is further configured to maintain, in a single entry of a page table, the status entry of the two or more memory elements, wherein the status indicates a row that is currently open in the two or more memory elements.

19. The processor of claim 17, wherein the memory controller is further configured to, in response to a prior memory command processed being a non-near-memory processing command and selecting the broadcast near-memory processing command for processing:
  close all open rows in the two or more memory elements in a memory module,
  open, in the two or more memory elements in the memory module, a row specified by the broadcast near-memory processing command, and
  update a single status entry for the two or more memory elements in a page table to indicate that the row specified by the broadcast near-memory processing command is open in the two or more memory elements.

20. The processor of claim 17, wherein the memory controller is further configured to:
  in response to a prior memory command processed being a broadcast near-memory processing command and selecting a non-near-memory processing command for processing:
    close all open rows in the two or more memory elements in a memory module,
    open a particular row in a particular memory element, from the two or more memory elements in the memory module, specified by the non-near-memory processing command, and
    update a status entry for the particular memory element in a page table to indicate that the particular row is open in the particular memory element.

\* \* \* \* \*